United States Patent

Hopkinson et al.

[15] 3,705,304
[45] Dec. 5, 1972

[54] PULSED NEUTRON WELL LOGGING APPARATUS HAVING MEANS TO VARY THE NEUTRON GENERATOR PULSE REPETITION RATE

[72] Inventors: Eric C. Hopkinson; Arthur H. Youmans, both of Houston, Tex.

[73] Assignee: Dresser Industries, Inc., Dallas, Tex.

[22] Filed: May 31, 1967

[21] Appl. No.: 642,592

[52] U.S. Cl. .....................250/83.3 R, 250/83.6 W
[51] Int. Cl. ..............................................G01v 5/00
[58] Field of Search.....250/83.3, 83.1, 83.1 PS, 83.6 W, 250/83.3 R

[56] References Cited

UNITED STATES PATENTS 3,358,142  12/1967  Hopkinson et al. ..........250/83.6 W X
3,566,116  2/1971   Nelligan.....................250/83.6 W X Primary Examiner—Archie R. Borchelt
Attorney—Robert W. Mayer, Daniel Rubin, Peter J. Murphy, Douglas M. Clarkson, Roy L. Van Winkle and William E. Johnson, Jr.

[57] ABSTRACT

A bistable multivibrator or scale of two circuit is inserted in the sync pulse line before a pulsed neutron generator to reduce the pulse repetition rate by a factor of two. The radiation detection system within the borehole instrument is gated in the conventional manner without the repetition rate of its detection gates being reduced by the factor of two. A second bistable multivibrator circuit is inserted in the sync pulse line before the sync pulse cable driver, the second multivibrator circuit causing the surface electronics to accept signal information during the first half of an elongated cycle which has not been corrected for activation background, and to accept information during the second half of the cycle which relates only to activation background. The signal information is combined with the background information to provide data relating to the decline of the thermal neutron population which is independent of the activation background counting rate.

10 Claims, 6 Drawing Figures

ARTHUR H. YOUMANS
ERIC C. HOPKINSON
INVENTORS.

ARTHUR H. YOUMANS
ERIC C. HOPKINSON
INVENTORS.

BY William E. Johnson Jr.
ATTORNEY.

ARTHUR H. YOUMANS
ERIC C. HOPKINSON
INVENTORS.

BY William E. Johnson Jr
ATTORNEY.

PULSED NEUTRON WELL LOGGING APPARATUS HAVING MEANS TO VARY THE NEUTRON GENERATOR PULSE REPETITION RATE

This invention relates to the art of geophysical prospecting in general and to the art of radioactivity well logging in particular and more particularly to improvements in such logging wherein the lifetime of neutrons in the formation is measured.

In the co-pending application of Arthur H. Youmans Ser. No. 292,927, filed July 5, 1963 and now U.S. Pat. No. 3,379,882 assigned to he assignee of the present invention, there is described a system for radioactivity well logging wherein the formations are irradiated with neutrons from a periodically varying source operating at a repetition rate of the order to magnitude of hundreds or thousands of cycles per second, being thus alternately on and off for periods of hundreds of microseconds. A detecting system is synchronized with the source to operate while the source is off. The radiation detected may be either slow neutrons or gamma rays which result from thermal neutron capture; in either case the signal is related to the population of thermal neutrons in the formation surrounding the borehole. From the time the source is turned off, the slow neutrons are gradually captured and the amount of radiation detected per unit time decreases until the source is again turned on. By measuring the number of thermal neutrons (or gamma rays produced by the thermal neutrons) present at any particular time, the rate of decay of the thermal neutron population may be measured. The rate of decay is dependent upon the nuclei of the material present in the formations and varies from formation to formation. This rate of decay is related to the time required for those nuclei to capture the thermal neutrons; therefore, in the system described therein, the measurement is related to this time and hence to the lifetime of the neutrons in the formations. The radioactivity well logging system described in said copending application comprises a pair of counting rate curves plus a curve indicative of the rate of decline of the neutron population which is a function of the ratio of the two counting rate curves. The early gate, or $N_1$, curve is in present commercial operation normally derived during the interval of 400 to 600 microseconds after time zero; that is, it is a measure of the radiation intensity detected during the interval from 400 to 600 microseconds after the termination of the neutron pulse from the neutron source. The later gate, or $N_2$ curve is a similar measurement derived during the interval from 700 to 900 microseconds after time zero.

The presence of activation background radiation while logging the decline of the thermal neutron population can produce erroneous evaluation of the thermal neutron capture cross section. The background radiation can result, for example, from oxygen activation caused by fluid flowing in a direction from the neutron source to the detector, or can result from activation occurring in the detector itself. Because of activation occurring in the detector, the discrimination level of the detector is usually set high enough to exclude all the background radiation except that due to oxygen activation.

The present invention relates to an improvement upon the system as described in said co-pending application and as such comprises, broadly, means for reducing the repetition rate of the pulsed neutron generator, while leaving the repetition rate of the detector gates unaltered. Means are also provided in the sync lines and in the surface electronics to eliminate the activation background counting rate from the signal information relating to the decline of the thermal neutron population.

Therefore, the principal object of the invention is to provide an improved system for determining geophysical characteristics of formations about a borehole;

It is a further object of the invention to provide an improved system for neutron well logging based on the decline of the thermal neutron population in the formations;

It is yet another object of the invention to provide an improved system for neutron well logging wherein the logging information is substantially independent of the background radiation;

It is still another object of the invention to provide an improved system for neutron well logging having means for measuring the background radiation and subtracting the background measurement from the measurements relating to the decline of the thermal neutron population.

Other objects, features and advantages of the invention will become apparent from the following detailed descriptions, when considered with the accompanying drawings, in which.

Figure 1:
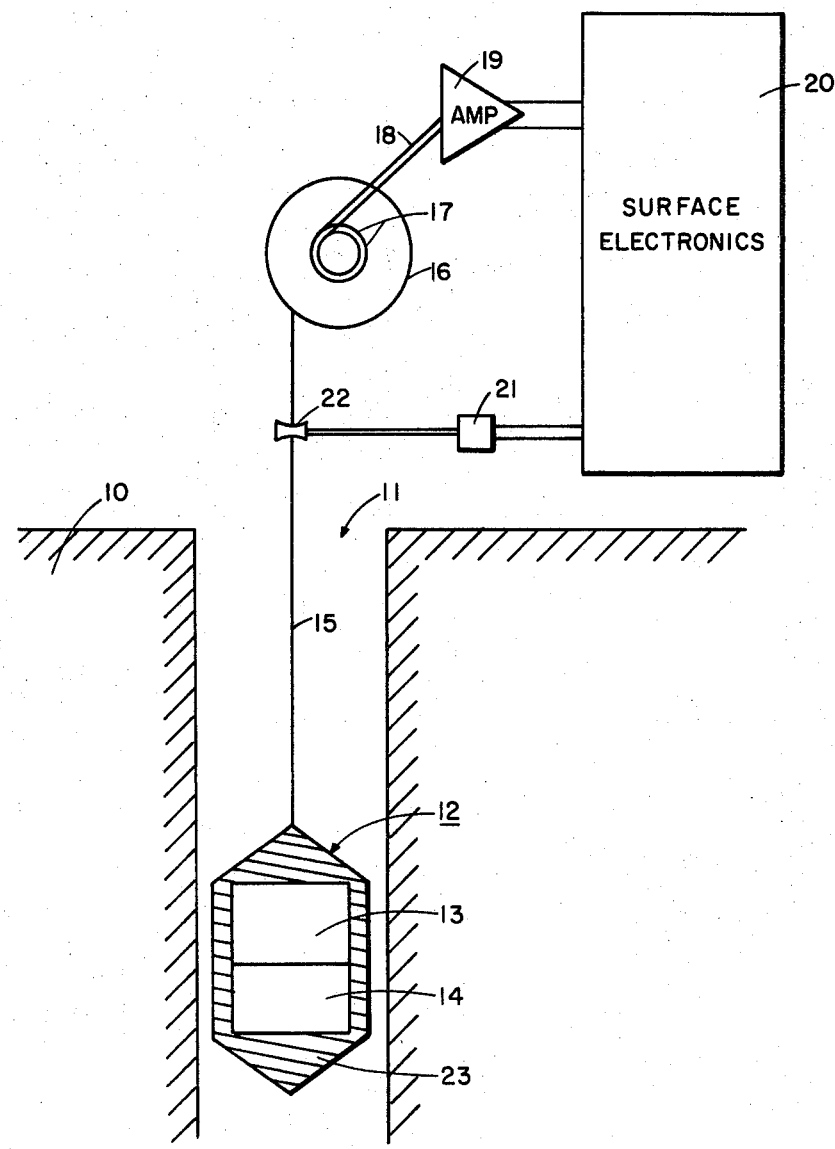
FIG. 1 is a side elevational view partly in section illustrating a system according to the invention, and the disposition of parts of the system relative to the strata to be examined.

Referring now to the drawings in detail, particularly to FIG. 1, there is illustrated schematically a radioactive well surveying operation in which a portion of the earth's surface 10 is shown in vertical section. A well 11 penetrates the earth's surface and may or may not be cased. Disposed within the well is subsurface instrument 12 of the well logging system. Subsurface instrument 12 comprises a detecting system 13 and a neutron source 14. Cable 15 suspends the instrument in the well and contains the required conductors for electrically connecting the instrument with the surface apparatus. The cable is wound on, or unwound from, drum 16 in raising and lowering the instrument 12 to traverse the well.

In making a radioactivity log of a well, instrument 12 is caused to traverse the well. Thereby neutrons from source 14 irradiate the formations surrounding the borehole, and radiations influenced by the formations are detected by detecting system 13. The resultant signal is sent to the surface through cable 15. Through slip rings and brushes 17 on the end of the drum 16, the signals are conducted by lines 18 to the amplifier 19 for amplification. The amplified signals are then coupled into the surface electronics section 20, to be described in more detail hereinafter. A recorder (illustrated in FIG. 5 within the block 55) is driven through a transmission 21 by measuring reel 22 over which cable 15 is drawn so that the recorder moves in correlation with depth as the instrument 12 traverses the well. The elements are shown diagrammatically, and it is to be understood that the associated circuits and power supplies are provided in a conventional manner. Amplifier 19 may be included in the subsurface instrument, or amplification may be effected both on the surface and in the subsurface instrument. It is also to be understood that the instrument housing 23 is constructed to withstand the pressures and mechanical and thermal abuses encountered in logging a deep well and provides adequate space within it to house the necessary apparatus and to permit the transmission or radiation through it.

As is well known in the art of radioactivity well logging, the formation 10 is irradiated by neutrons exiting from the neutron source 14, for example, a D-T accelerator. These neutrons participate in elastic and inelastic collisions with the atoms contained in the various layers of the formation. The secondary radiation resulting from bombardment by the primary radiation in the form of neutrons from the source 14 is detected by the radiation detector 13.

The measurement of the decline of the thermal neutron population provides a means for determining a property of the material surrounding the borehole which is a definite, calculable, physical parameter, the macroscopic capture cross section of the formation.

Figure 2:
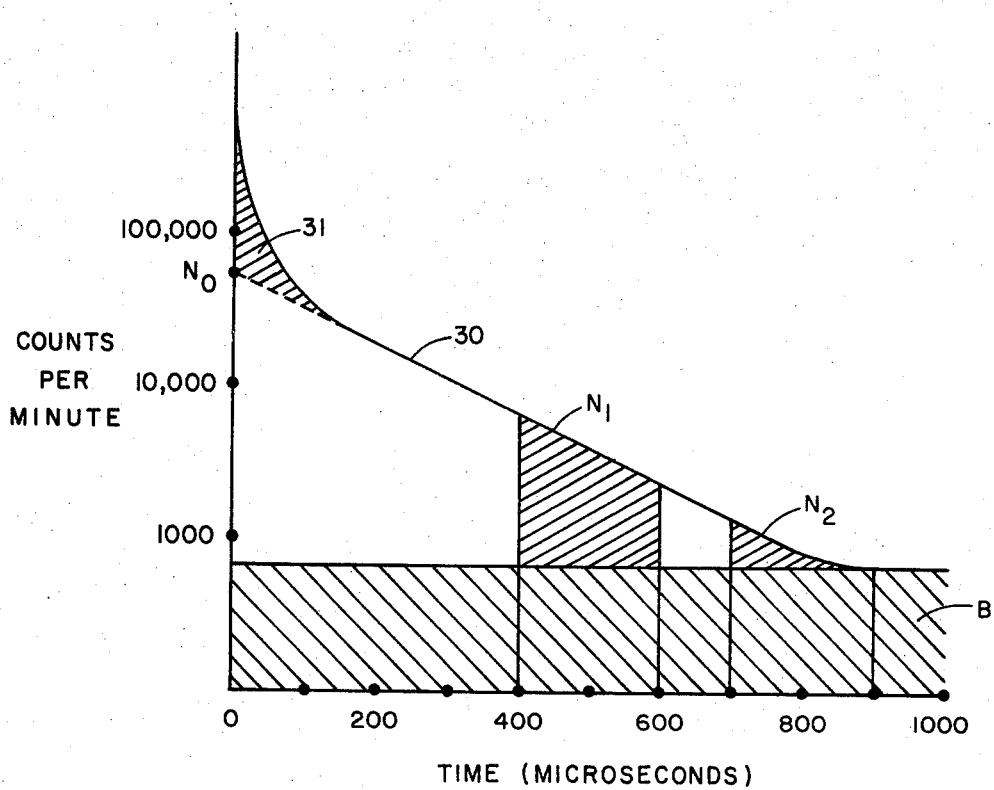
FIG. 2 is a schematic representation of the characteristic decay of the thermal neutron population following a burst of fast neutrons within a well.

FIG. 2 illustrates a counting rate curve 30 which is exemplary of the decline of the thermal neutron population following each neutron source pulse. The region 31 of the curve is influenced primarily by fast neutrons from the source, whereas the region B represents the background radiation count within the borehole. The counting rates $N_1$ and $N_2$ are taken, respectively, during the periods of 400 — 600 and 700 — 900 microseconds following the neutron pulse.

Figure 3:
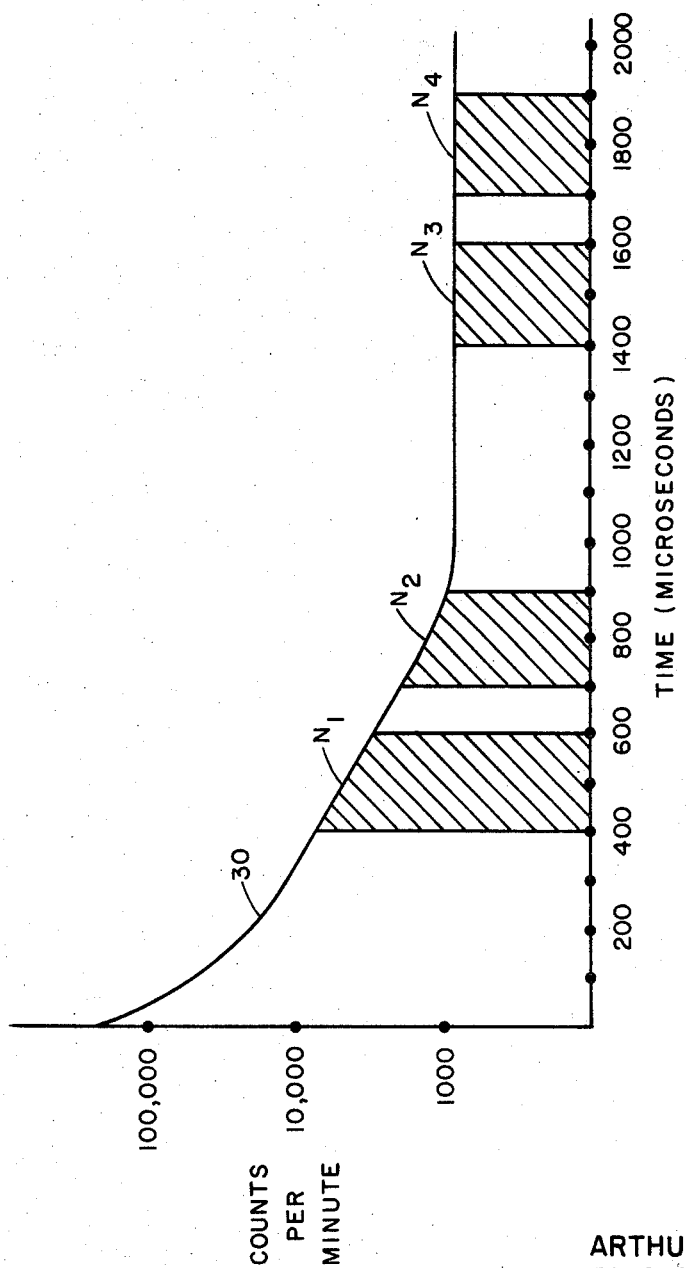
FIG. 3 is a schematic representation of the characteristic decay of the thermal neutron population wherein the cycle is elongated according to the invention.

FIG. 3 illustrates a counting rate curve 30 which has been elongated according to the invention and modified to include four counting rates $N_1$, $N_2$, $N_3$ and $N_4$, taken respectively at 400 — 600, 700 — 900, 1400 — 1600 and 1700 — 1900 microseconds following the neutron pulse.

Figure 4:
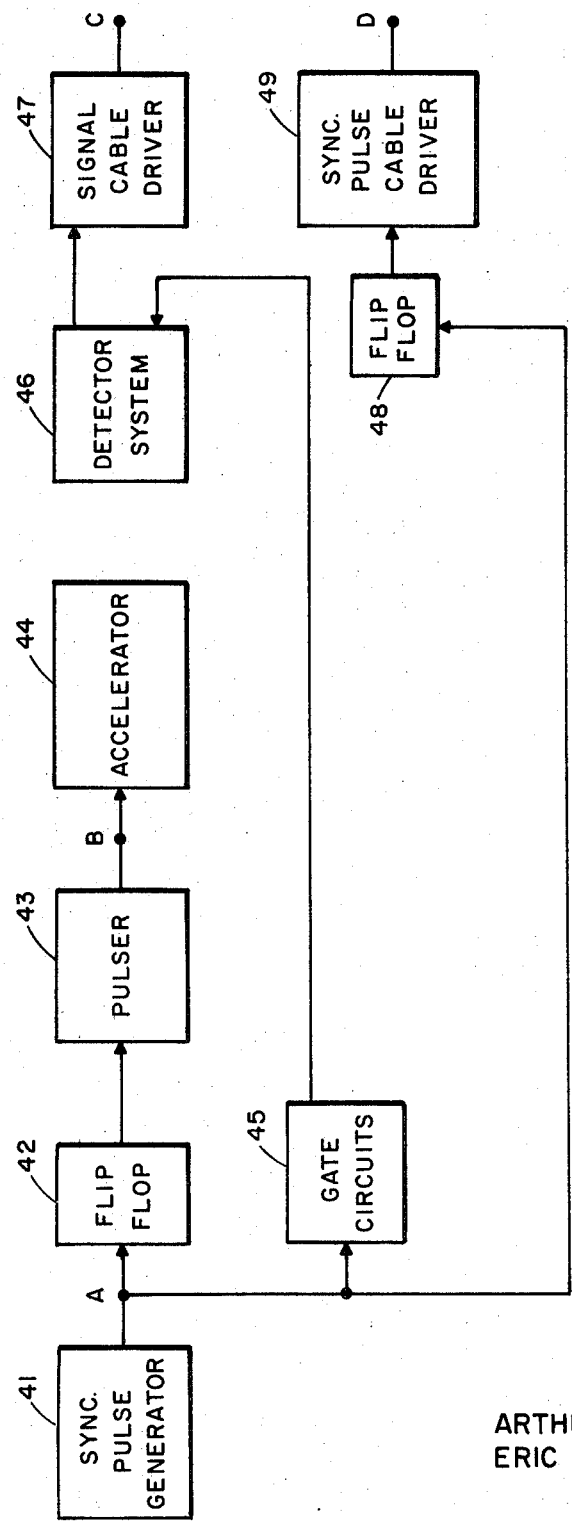
FIG. 4 is a block diagram of the sub-surface circuitry in the system according to the invention.

FIG. 4 illustrates in block diagram the subsurface circuitry for elongating the cycle according to the invention. A sync pulse generator 41, for example as is illustrated and described in *Electronics, Experimental Techniques*, Elmore and Sands, published by the Nc-Graw-Hill Book Company in 1949, page 319–339, is connected through junction A to a Flip-Flop 42 which can be any conventional bistable multivibrator or scale of two circuit. An example of a conventional flip-flop circuit is found on page 96–99 of the aforementioned *Electronics, Experimental Techniques*. The output of Flip-Flop 42, having a pulse repetition rate one-half that of the sync pulse generator 41, is coupled to the high voltage pulser 43, the output of which is connected through junction B to the D-T accelerator 44. If desired, the pulser 43 and accelerator 44 can be built in accordance with U.S. Pat. No. 3,309,522 to Arthur H. Youmans et al. Also if desired, the pulser 43 can be built in accordance with the teachings for building the sync pulse generator 41 as set forth above. Thus, it should be appreciated that a sync pulse at junction A having a pulse repetition rate of 1000 cycles per second causes the accelerator 44 to produce a burst of neutrons at the rate of 500 cycles per second.

Figure 6:
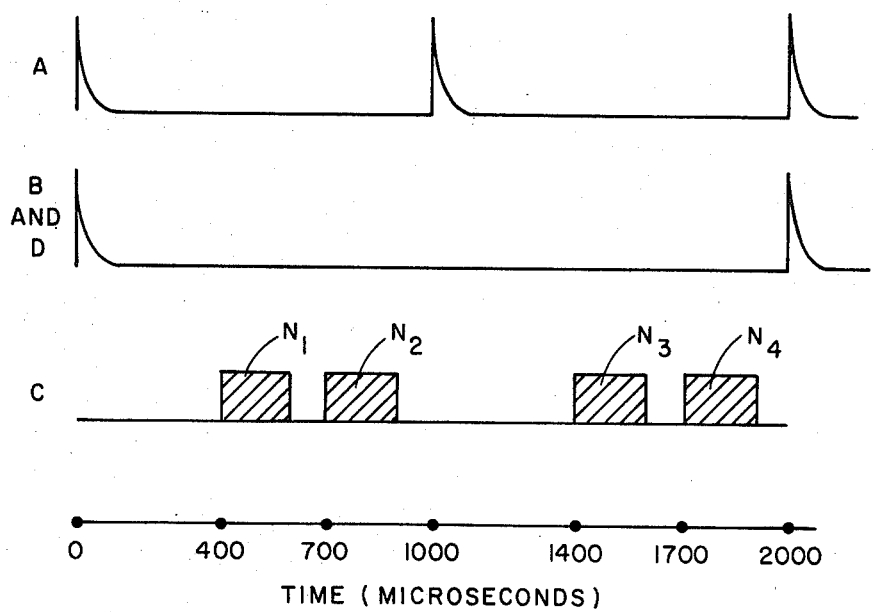
FIG. 6 is a schematic representation of electrical waveforms at designated points within the circuitry in FIGS. 4 and 5.

Junction A is also connected to the gate circuits 45. The circuits 45 provide a delay of 400 microseconds following each sync pulse from generator 41. A gate is opened to the detector system 46 for 200 microseconds, followed by another delay of 100 microseconds. The circuits 45 and 46 are conventional gating and detector system circuits as disclosed in copending application, Ser. No. 361,159, filed Apr. 20, 1964, now U.S. Pat. No. 3,358,142, issued Dec. 12, 1967, and assigned to the assignee of the present invention. A second gate within the circuits 45 is then opened to the detector system for 200 microseconds. This sequence is illustrated at junction C in FIG. 6, junction C being the output of the signal cable drive 47, the driver 47 having as its input the output of the detector system 46.

Junction A is also connected to a second Flip-Flop 48 which can be any conventional bistable multivibrator or scale of two circuit. The output of the circuit 48 is connected to the sync pulse cable driver 49, the output of which is junction D. If desired, the signal cable drive 47 and the sync pulse cable driver 49 can be built in accordance with U.S. Pat. No. 3,192,386 to E. C. Hopkinson.

Figure 5:
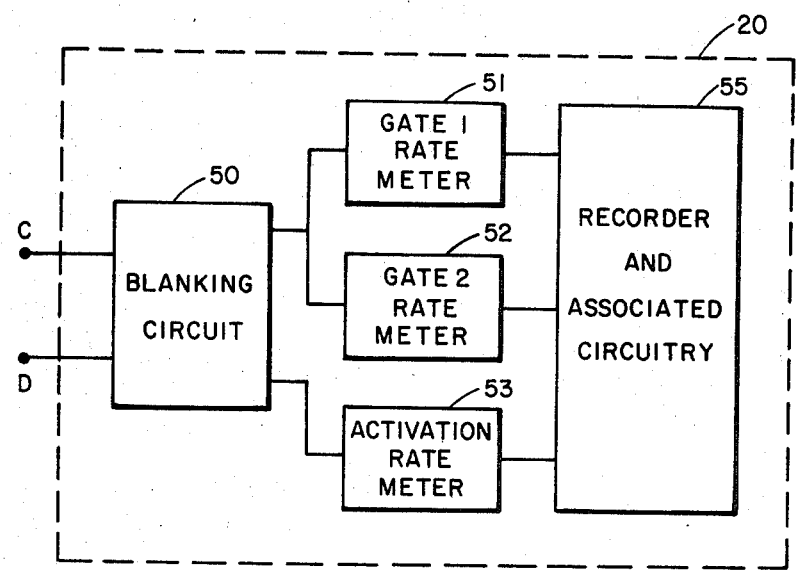
FIG. 5 is a block diagram of the surface electronics in the system according to the invention.

FIG. 5 illustrates the recorder and surface electronics according to the invention. The signals from the sub-surface circuitry are transported through the conductors in the cable 15 of FIG. 1 and are coupled from junction C and D generally into the block 20 and specifically into the blanking circuit 50. Such a blanking circuit 50 can be any conventional switching circuit, for example, a bistable multi-vibrator, which is triggered from the sync pulse cable driver and which causes the rate meters 51 and 52 to be driven while the switch is in one position and the meter 53 to be driven while the switch is in another position. The junction C transports all of the counting rate information identified in FIGS. 3 and 6 as $N_1$, $N_2$, $N_3$ and $N_4$. During a typical 2000 microsecond cycle, the information representative of $N_1$ and $N_2$ is respectively coupled into the rate meters 51 and 52, but only during the first half of the elongated cycle, i.e., during the first 1000 microseconds. During the second 1000 microseconds, the blanking circuit 50 blanks the rate meters 51 and 52 and triggers the activation rate meter 53. Thus, it should be appreciated that the rate meters 51 and 52 are respectively responsive to the $N_1$ and $N_2$ counting rates during the first 1000 microseconds and the rate meter 53 is responsive to the $N_3$ and/or $N_4$ counting rates during the second 1000 cycles. The ratemeters 51, 52 and 53 are conventional and can be built in accordance with U.S. Pat. No. 3,538,329 to F. J. Niven, Jr., especially in accordance with FIG. 3 of such patent.

While only one activation rate meter 53 is illustrated, it should be appreciated that an alternative embodiment would include a rate meter for each of the $N_3$ and $N_4$ counting rates. Likewise, the rate meter 53 can be triggered by the circuit 50 to measure either the $N_3$ or $N_4$ counting rates or the sum of $N_3$ and $N_4$ counting rates.

The outputs from gates 51, 52 and 53 are coupled into the block 55. The recorder and associated circuitry 55 can be built in accordance with U.S. Pat. No. 3,393,403 to M. Davis et al. Although not illustrated, the background count as measured by the rate meter 53, for example, the counting rate $N_4$, can either be subtracted from each of $N_1$ and $N_2$, or can be plotted simultaneously with $N_1$ and $N_2$. If $N_4$ is subtracted from each of $N_1$ and $N_2$, the corrected values for $N_1$ and $N_2$ can then be combined, for example, as a ratio, to provide a more accurate determination of the thermal neutron capture cross section which is independent of the activation background radiation.

It should thus be appreciated that there has been described herein a radioactivity Well logging system providing for the determination of the thermal neutron capture cross section corrected for activation background radiation. However, modifications of this invention other than these herein suggested will become apparent to those of ordinary skill in the art after reading this disclosure. For example, whereas the preferred embodiment uses a scale of two circuit, it should be appreciated by those in the art that other scale factors could be used to either increase or decrease the pulse repetition rates throughout the system according to the invention. Therefore, it is intended that the matter contained in the foregoing description and the accompanying drawings be interpreted in an illustrative sense, and not in a limiting sense, when consideration is given to the appended claims.

What is claimed is:

1. A system for radioactivity well logging comprising a source of neutrons, a sync generator having a given pulse repetition rate, pulser means for causing said source to produce a discrete burst of neutrons, a scaler circuit connected between said sync generator and said pulser, whereby said source is caused to pulse at a repetition rate reduced by the scale circuit from said given pulse repetition rate, and radiation detection means including a first and a second gate connected to said sync generator and in spaced relationship to said neutron source, whereby each of said gates in said detection means is opened by the number of said scaler circuit for each time said neutron source is pulsed.

2. The system according to claim 1 wherein said scaler circuit comprises a scale of two.

3. The system according to claim 1 including a sync pulse cable driver and a second scaler circuit having the same number as said first mentioned scaler circuit connected between said sync generator and said cable driver, whereby the output of said cable driver has sync pulses having a pulse repetition rate the same as the pulse repetition rate of said neutron source.

4. The system according to claim 3 wherein said second scaler circuit comprises a scale of two.

5. The system according to claim 4 including a surface blanking circuit and three counting rate meters, two of said counting rate meters being respectively connected to said first and second gates during one portion of the time following each neutron pulse and the third counting rate meter being connected to at least one of said gates during another portion of the time following each neutron pulse.

6. The system according to claim 5 including means for subtracting the counting of said third counting rate meter from the respective counting rates of said two counting rate meters.

7. The system according to claim 5 including means for recording the counting rates from each of said counting rate meters.

8. The system according to claim 6 including means for recording the counting rates from said two counting rate meters after the counting rate from said third counting rate meter is respectively subtracted from each of the two.

9. The system according to claim 6 including means for deriving a function of the ratio of the counting rates of said two counting rate meters after subtraction of said third counting rate.

10. The system according to claim 9 wherein said function is the thermal neutron capture cross section.

* * * * *